United States Patent
Touno

(10) Patent No.: US 9,435,361 B2
(45) Date of Patent: Sep. 6, 2016

(54) STEERING DEVICE

(71) Applicant: NIHON PLAST CO., LTD., Fujinomiya-shi, Shizuoka (JP)

(72) Inventor: Kazuhiro Touno, Fujinomiya (JP)

(73) Assignee: NIHON PLAST CO., LTD., Fujinomiya-shi (JP)

(*) Notice: Subject to any disclaimer, the term of this patent is extended or adjusted under 35 U.S.C. 154(b) by 181 days.

(21) Appl. No.: 14/284,739

(22) Filed: May 22, 2014

(65) Prior Publication Data

US 2014/0346018 A1    Nov. 27, 2014

(30) Foreign Application Priority Data

May 24, 2013  (JP) ................................ 2013-109522

(51) Int. Cl.
| | | |
|---|---|---|
| *H01H 9/00* | (2006.01) | |
| *F16B 5/02* | (2006.01) | |
| *H01H 13/50* | (2006.01) | |
| *B60Q 1/00* | (2006.01) | |
| *B62D 1/04* | (2006.01) | |

(52) U.S. Cl.
CPC .............. *F16B 5/025* (2013.01); *B60Q 1/0082* (2013.01); *B62D 1/046* (2013.01); *H01H 13/50* (2013.01); *H01H 2225/00* (2013.01); *H01H 2231/026* (2013.01)

(58) Field of Classification Search
CPC ..... F16B 5/025; B62D 1/046; B60Q 1/0082; H01H 13/50
USPC ...................................................... 200/61.54
See application file for complete search history.

(56) References Cited

U.S. PATENT DOCUMENTS

| | | | | |
|---|---|---|---|---|
| 4,590,340 A | * | 5/1986 | Koike ..................... | B60Q 5/003 200/61.54 |
| 6,592,142 B2 | * | 7/2003 | Landen .................. | B60Q 5/003 280/728.2 |
| 2002/0033321 A1 | * | 3/2002 | Miyako .................. | B60K 37/06 200/61.54 |
| 2002/0046936 A1 | * | 4/2002 | Ibe ........................ | B60Q 1/0082 200/61.54 |
| 2004/0174001 A1 | | 9/2004 | Schuetz et al. | |

FOREIGN PATENT DOCUMENTS

| | | |
|---|---|---|
| DE | 20303388 U1 | 7/2003 |
| DE | 60100588 T2 | 4/2004 |
| JP | H06-270816 A | 9/1994 |

OTHER PUBLICATIONS

The German office action letter issued on Nov. 23, 2015 in the counterpart German patent application.

* cited by examiner

*Primary Examiner* — Renee Luebke
*Assistant Examiner* — Lheiren Mae A Caroc
(74) *Attorney, Agent, or Firm* — MOTS Law, PLLC

(57) ABSTRACT

A back cover includes an opening configured to penetrate the back cover throughout between an exterior surface and an interior surface of the back cover, lock receivers capable of engaging respectively with hook-shaped lock portions of a switch unit, and fastening portions capable of fastening the switch unit to the back cover. The lock receivers and the fastening portions are arranged near a peripheral edge of the opening at positions with the opening interposed between the lock receivers and the fastening portions.

11 Claims, 5 Drawing Sheets

STEERING DEVICE

CROSS REFERENCE TO RELATED APPLICATION

This application is based upon and claims the benefit of priority from the prior Japanese Patent Application No. 2013-109522, filed on May 24, 2013, the entire contents of which are incorporated herein by reference.

BACKGROUND

1. Technical Field

The present invention relates to a steering device used in vehicles such as automobiles, aircrafts, ships, and railroad vehicles.

2. Related Art

Japanese Patent Application Publication No. Hei 06-270816 describes a related steering device. In the steering device, a switch unit is fixed to the steering device by fastening an attachment member of the switch unit and attachment brackets protruding from a base plate of an airbag module together with bolts screwed into nuts from outside

SUMMARY

In the aforementioned related steering device, the nuts and the bolts are used in work of attaching the switching unit to the base plate of the airbag module, and the switch unit may be misaligned with respect to the base plate due to fastening torque of the bolts. In order to prevent such misalignment of the switch unit, the attachment work needs careful attention paid by a worker and accordingly may require many man hours. Moreover, attachment strength of the switch unit may be so weak that the attachment member may bend in a switch operation direction of the switch unit, for example. Furthermore, since the switch unit is supported only by the attachment member in a cantilever fashion, the switch unit may resonate due to travelling vibrations or the like of a vehicle.

An object of the present invention is to provide a steering device which enables a switch unit to be attached in fewer man hours with a high accuracy and which can increase attachment strength of the switch unit so much that no resonance will occur due to travelling vibrations or the like of a vehicle.

A steering device in accordance with some embodiments includes a boss supportable by a steering shaft, a spoke supported by the boss, a rim supported by the boss via the spoke, a front cover covering an upper portion of the boss, a back cover covering a back surface of the front cover and a periphery of the boss, and a switch unit supported by an exterior side of the back cover and including hook-shaped lock portions. The back cover includes an opening configured to penetrate the back cover throughout between an exterior surface and an interior surface of the back cover, lock receivers capable of engaging respectively with the lock portions, and fastening portions capable of fastening the switch unit to the back cover. The lock receivers and the fastening portions are arranged near a peripheral edge of the opening at positions with the opening interposed between the lock receivers and the fastening portions.

In the configuration described above, the switch unit is placed to penetrate the opening of the back cover throughout when viewed in any of directions from the exterior side and the interior side of the back cover, and the lock receivers and the fastening portions are located at the positions with the opening interposed between the lock receivers and the fastening portions. Hence, the switch unit supported by the lock receivers and the fastening portions acts as a beam for the back cover. With this structure, the switch unit is firmly fixed to the back cover, and the opening determines the attachment position of the switch unit. Thus, the switch unit can be attached to the back cover in fewer man hours with a high accuracy. Moreover, the lock portions can distribute a load applied in an operation of the switch unit, to the back cover via the lock receivers. This increases the attachment strength of the switch unit so much that the switch unit is less likely to resonate due to travelling vibrations or the like of a vehicle.

The back cover may include a reinforcement rib on the interior surface of the back cover around the opening.

In the configuration described above, the reinforcement rib is formed on the interior surface of the back cover around the opening. Accordingly, collapsing of the back cover to which the switch unit is attached can be surely prevented.

The back cover may include a portion which the reinforcement rib is provided on and has a substantially uniform plate thickness.

In the configuration described above, the portion of back cover around the opening has the substantially uniform plate thickness. Accordingly, force applied to the back cover is distributed and wave-like deformation is less likely to occur in the back cover.

The reinforcement rib may include a distal end positioned substantially at a same height as a part of the interior surface of the back cover around an attachment position of the switch unit.

In the configuration described above, the distal end of the reinforcement rib is formed substantially at the same height as the part of the interior surface of the back cover around the attachment position of the switch unit. Accordingly, when the front cover is attached to the steering device after the switch unit is fixed to the back cover, various members provided in the front cover do not interfere with the reinforcement rib and workability of attachment is greatly improved.

DETAILED DESCRIPTION

Figure 1:
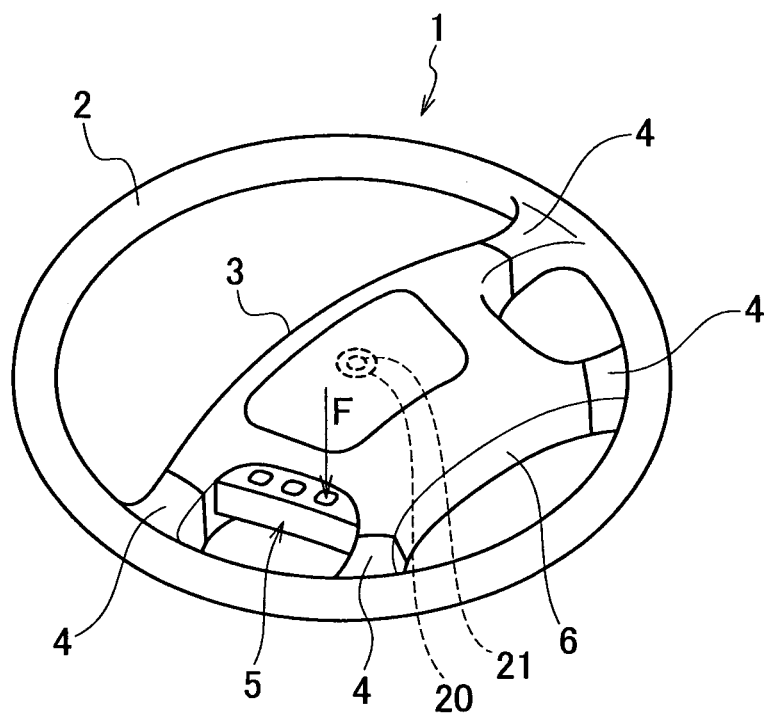
FIG. 1 is a perspective view of a steering device according to an embodiment of the present invention.

An embodiment of the present invention is described below in detail on the basis of the drawings. A steering device in accordance with some embodiments includes a boss supportable by a steering shaft, a spoke supported by the boss, a rim supported by the boss via the spoke, a front cover covering an upper portion of the boss, a back cover covering a back surface of the front cover and a periphery of the boss, and a switch unit supported by an exterior side of the back cover and including hook-shaped lock portions.

The back cover includes an opening configured to penetrate the back cover throughout between an exterior surface and an interior surface of the back cover, lock receivers capable of engaging respectively with the lock portions, and fastening portions capable of fastening the switch unit to the back cover. The lock receivers and the fastening portions are arranged near a peripheral edge of the opening at positions with the opening interposed between the lock receivers and the fastening portions. The configuration described above enables attachment of the switch unit to the back cover in fewer man hours with a high accuracy. Moreover, the configuration increases attachment strength of the switch unit and makes the switch unit less likely to resonate due to travelling vibrations or the like of a vehicle.

A steering device 1 in the embodiment of the present invention is described by using FIGS. 1 to 5. In the embodiment, the steering device 1 is described as a steering device for an automobile but is not limited to this. The steering device 1 includes a boss 20 supportable by a steering shaft 21, a spokes 4 formed by casting magnesium around the boss 20, a wheel-shaped rim 2 supported by the boss 20 via the spokes 4, a synthetic resin front cover 3 covering an upper portion of the boss 20 and including therein an airbag main body (not illustrated in the drawings), a synthetic resin back cover 6 covering a back surface (a lower side in FIG. 1) of the front cover 3 and a periphery of the boss 20, a switch unit 5 supported by an exterior surface 6a which is an exterior side of the back cover 6, and spoke cover portions 4a formed continuously with the back cover 6. In addition to the members described above, the steering device 1 may include various devices such as a horn switch, a telephone, a navigator, and an integrated warning device.

Figure 3:
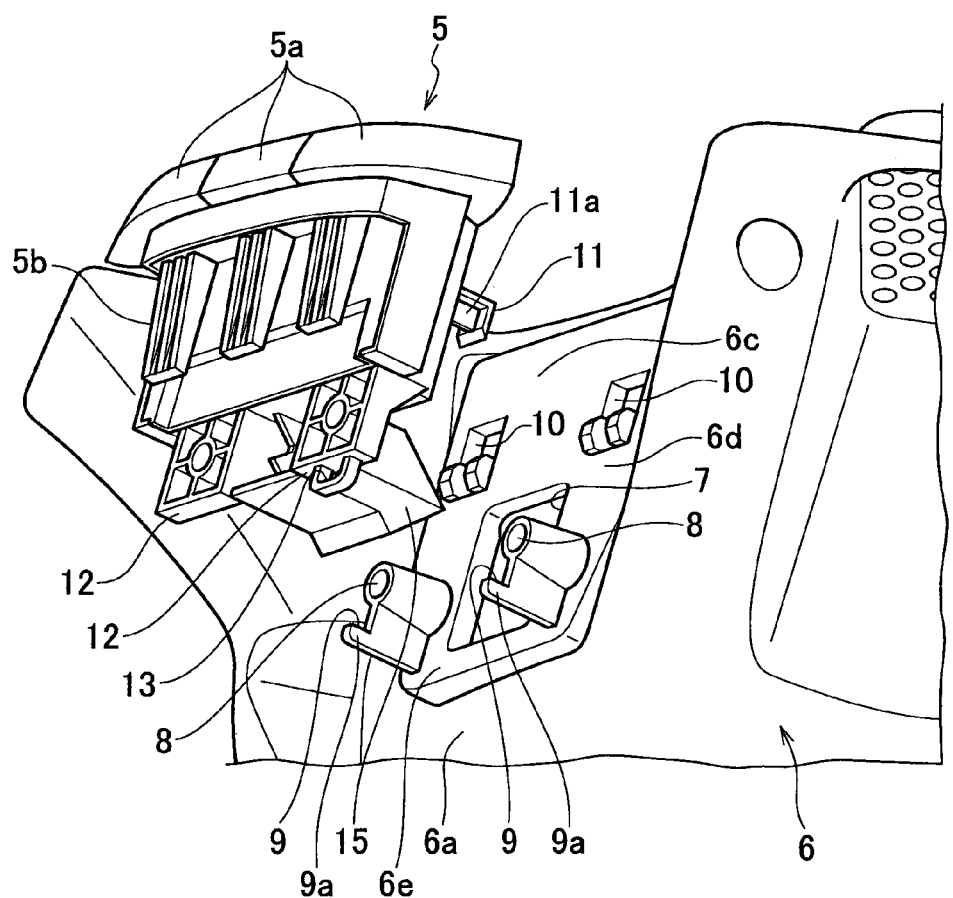
FIG. 3 is an exploded perspective view showing the back cover of FIG. 2 from a switch unit side.
Figure 4:
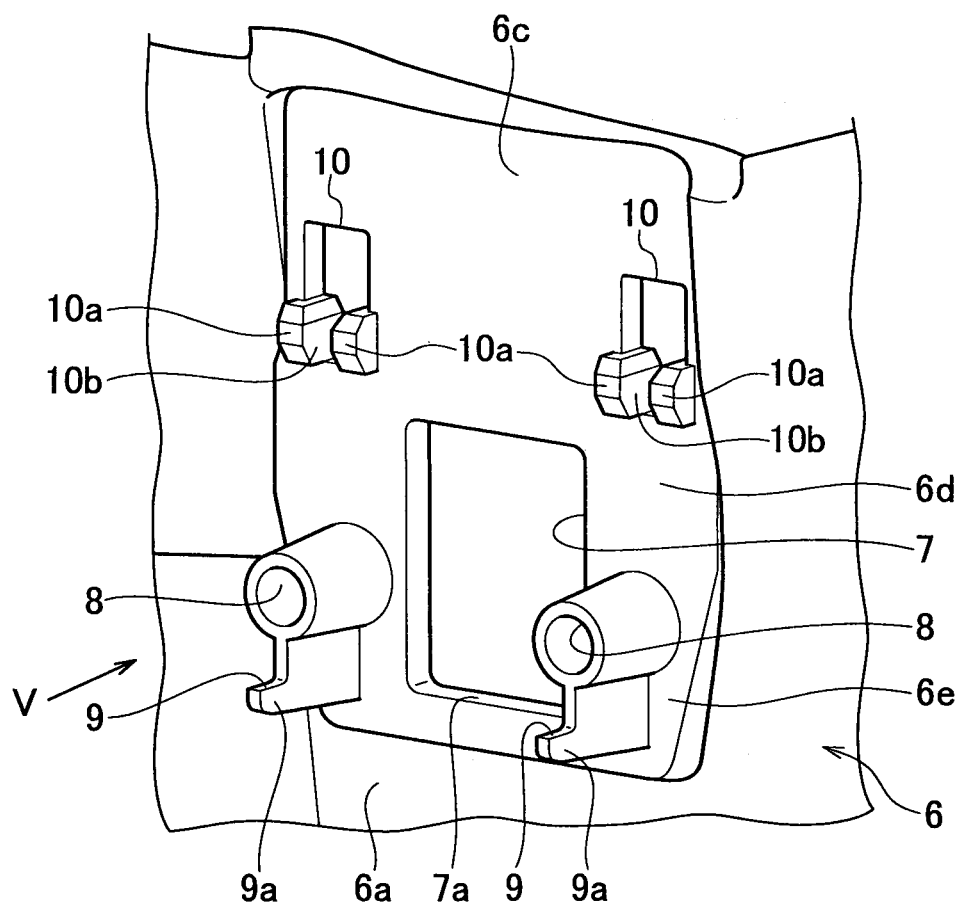
FIG. 4 is a perspective view showing a main portion of the back cover of FIG. 3 in an enlarged manner.

The switch unit 5 includes a button portion 5a which can be pressed in a downward direction in FIG. 3, a switch main body 5b, and hook-shaped lock portions 11. In the back cover 6, an opening 7, lock receivers 10 and fastening portions 8, 8 are formed. The opening 7 has a rectangular shape elongated in an up-down direction and penetrates the back cover 6 throughout between the exterior surface 6a and an interior surface 6b of the back cover 6 such that the switch main body 5b can be inserted therethrough. The lock receivers 10 can engage with the lock portions 11, and the fastening portions 8, 8 are portions to which the switch main body 5b can be fastened. The lock receivers 10 and the fastening portions 8 are arranged near a peripheral edge of the opening 7 at positions with the opening 7 interposed between the lock receivers 10 and the fastening portions 8. A lower end portion 7a of the opening 7 comes in close contact with a connection portion main body 15 of the switch main body 5b which will be described later. The fastening portions 8, 8 are formed in columnar shapes to protrude from the exterior surface 6a of the back cover 6. Turn stoppers 9, 9 are formed in ledge shapes below the fastening portions 8, 8, respectively. Bottom portions 12, 12 of the switch main body 5b are placed on the turn stoppers 9, respectively. The switch unit 5 can be temporarily fixed by engaging an engagement hole portion 13 of the switch main body 5b to one of engagement protrusions 9a formed to protrude respectively from lower portions of the turn stoppers 9.

Figure 5:
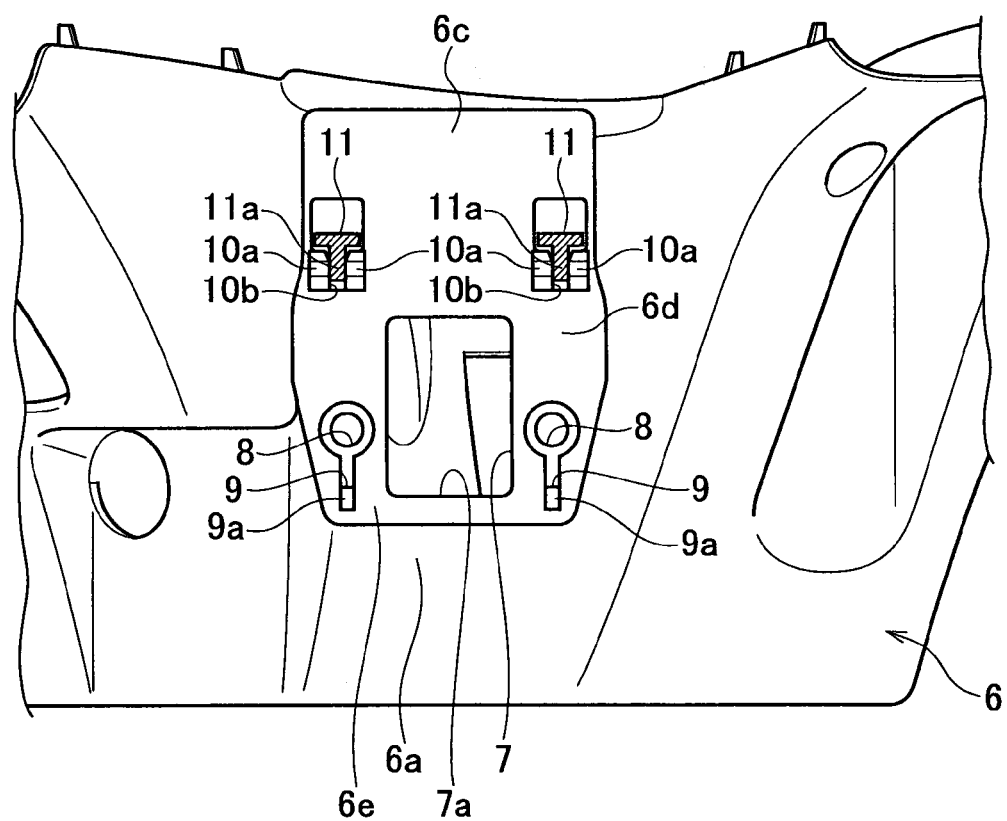
FIG. 5 is a front view in a direction of the arrow V of FIG. 4.

Each of the lock receivers 10 includes protrusions 10a, 10a which penetrate through the exterior surface 6a and the interior surface 6b to protrude to the exterior surface 6a side, and a gap portion 10b which is formed between the protrusions 10a, 10a. As shown in FIG. 5, a T-shaped gap is formed by the protrusions 10a, 10a and the gap portion 10b. Each of the lock portions 11 has a T-shaped cross section which is formed of a portion configured to ride on the protrusions 10a, 10a and a rib 11a configured to be inserted into the gap portion 10b. This shape increases the strength of the lock portions 11. When the switch unit 5 is fastened to the fastening portions 8, 8 with screws, turning of the hook-shaped lock portions 11 is restricted by the protrusions 10a and the gap portions 10b of the lock receivers 10 and turning of the switch unit 5 is thus stopped. Moreover, since the pair of the fastening portions 8, 8 and the pair of the lock receivers 10, 10 are spaced away from each other in the up-down direction and the fastening portions 8, 8 and the lock receivers 10, 10 are arranged such that the opening 7 interposed between the fastening portions 8, 8 and between the lock receivers 10, 10, a turn stopping effect in the fastening of the switch unit 5 to the fastening portions 8, 8 is improved.

Linear reinforcement ribs 14, 14 are formed on the interior surface 6b of the back cover 6 at neighboring portions on both sides of the opening 7. Attachment surface portions 6c, 6d, 6e of the back cover 6 on which the reinforcement ribs 14, 14 are provided have a substantially uniform plate thickness. In detail, the attachment surface portion 6c is formed to protrude to the interior surface 6b side, the attachment surface portion 6e is formed to protrude to the exterior surface 6a side, and the attachment surface portion 6d is formed to be flush with the exterior surface 6a. The connection portion main body 15 of the switch main body 5b has a function of a connector for connection with a not-illustrated airbag inflator.

Figure 2:
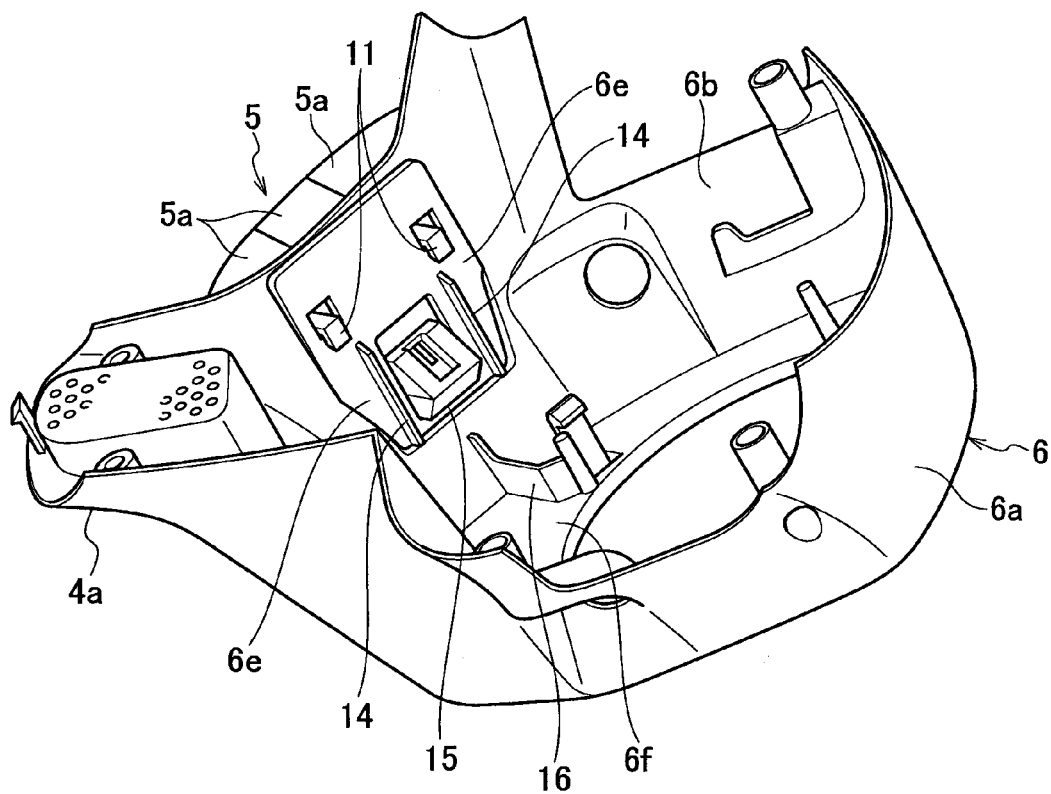
FIG. 2 is an explanation perspective view showing an interior surface of a back cover in the steering device of FIG. 1.

Distal ends of the reinforcement ribs 14, 14 are formed substantially at the same height as a part of the interior surface 6b of the back cover 6 around an attachment position of the switch main body 5b. Moreover, as shown in FIG. 2, a rib 16 is provided to stand upright between the interior surface 6b and a bottom surface 6f of the back cover 6.

As described above, the steering device 1 of the embodiment includes at least the boss 20 supportable by the steering shaft 21, the rim 2 supported by the boss 20 via the spokes 4, the front cover 3 covering the upper portion of the boss 20, the back cover 6 covering the back surface of the front cover 3 and the periphery of the boss 20, and the switch unit 5 supported on the exterior surface 6a of the back cover 6. In the back cover 6, there are formed the opening 7 which penetrates the back cover 6 throughout between the exterior surface 6a and the interior surface 6b, the lock receivers 10 which can engage with the hook-shaped lock portions 11 in the switch unit 5, and the fastening portions 8 to which the switch main body 5b of the switch unit 5 can be fastened. The lock receivers 10 and the fastening portions 8 are arranged near the peripheral edge of the opening 7 at the positions with the opening 7 interposed between the lock receivers 10 and the fastening portions 8. In this structure, the switch unit 5 is placed to penetrate the opening 7 of the back cover 6 throughout when viewed in any of directions from the exterior side and the interior side of the back cover 6, and the lock receivers 10 and the fastening portions 8 are located at the positions with the opening 7 interposed therebetween. Hence, the switch main body 5b of the switch unit 5 supported by the lock receivers 10 and the fastening portions 8 acts as a beam for the back cover 6. With this structure, the switch unit 5 is firmly fixed to the back cover 6, and the opening 7 determines the attachment position of the switch unit 5. Thus, the switch unit 5 can be attached to the back cover 6 in fewer man hours with a high accuracy. Moreover, the lock portions 11 can distribute a load F applied in an operation of the switch unit 5, to the back cover 6 via the lock receivers 10. This increases the attachment strength of the switch unit 5 so much that the switch unit 5 will be less likely to resonate due to travelling vibrations or the like of a vehicle.

The reinforcement ribs 14, 14 are formed on the interior surface 6*b* of the back cover 6 around the opening 7. Accordingly, collapsing of the back cover 6 to which the switch unit 5 is attached can be surely prevented.

The back cover 6 around the opening 7 is formed to have a substantially uniform plate thickness. Accordingly, force applied to the back cover 6 such as the load F generated in the operation of the switch unit 5 is distributed and wave-like deformation is less likely to occur in the back cover 6.

The distal ends of the reinforcement ribs 14, 14 are formed substantially at the same height as the part of the interior surface 6*b* of the back cover 6 around the attachment position of the switch main body 5*b*. Accordingly, when the front cover 3 is attached to the steering device 1 after the switch main body 5*b* is fixed to the back cover 6, various members provided in the front cover 3 do not interfere with the reinforcement ribs 14, 14 and workability of attachment is greatly improved.

In the embodiment, the steering device 1 is described by giving an example in which the steering device 1 is used in an automobile. However, the steering device 1 is not limited to this example and may be used in vehicles such as aircrafts, ships, and railroad vehicles. Moreover, in the case of casting the spokes 4, the spokes 4 may be molded by casting magnesium.

In the embodiment, the opening 7 provided in the back cover 6 is described as an opening through which the switch main body 5*b* can be inserted. However, the present invention is not limited to this configuration. For example, a not-illustrated connector member for connection may be arranged on the interior side of the back cover 6, be inserted through the opening 7 in the back cover 6, and be connected to the switch unit 5.

Although the embodiments of the present invention has been described above, the invention is not limited to the above embodiment, and various modifications are possible.

The invention claimed is:

1. A steering device comprising:
a boss supportable by a steering shaft;
a spoke supported by the boss;
a rim supported by the boss via the spoke;
a front cover covering an upper portion of the boss;
a back cover covering a back surface of the front cover and a periphery of the boss; and
a switch unit supported by an exterior side of the back cover and including hook-shaped lock portions,
wherein the back cover includes:
an opening configured to penetrate the back cover throughout between an exterior surface and an interior surface of the back cover;
lock receivers capable of engaging respectively with the lock portions; and
fastening portions capable of fastening the switch unit to the back cover,
wherein the lock receivers and the fastening portions are arranged near a peripheral edge of the opening at positions with the opening interposed between the lock receivers and the fastening portions, and
wherein the lock portions engaged with the lock receivers and the fastening portions are arranged near the peripheral edge of the opening at positions with the opening interposed between the lock receivers and the fastening portions.

2. The steering device according to claim 1, wherein the back cover includes a reinforcement rib on the interior surface of the back cover around the opening.

3. The steering device according to claim 2, wherein the back cover includes a portion which the reinforcement rib is provided on and has a uniform plate thickness.

4. The steering device according to claim 3, wherein the reinforcement rib includes a distal end positioned at a same height as a part of the interior surface of the back cover around an attachment position of the switch unit.

5. The steering device according to claim 2, wherein the reinforcement rib includes a distal end positioned at a same height as a part of the interior surface of the back cover around an attachment position of the switch unit.

6. The steering device according to claim 1, wherein the fastening portions are capable of fastening the switch unit to the back cover with screws.

7. A steering device comprising:
a boss supportable by a steering shaft;
a spoke supported by the boss;
a rim supported by the boss via the spoke;
a front cover covering an upper portion of the boss;
a back cover covering a back surface of the front cover and a periphery of the boss; and
a switch unit supported by an exterior side of the back cover and including hook-shaped lock portions,
wherein the back cover includes:
an opening configured to penetrate the back cover throughout between an exterior surface and an interior surface of the back cover;
lock receivers capable of engaging respectively with the lock portions; and
fastening portions capable of fastening the switch unit to the back cover,
wherein the lock receivers and the fastening portions are arranged near a peripheral edge of the opening at positions with the opening interposed between the lock receivers and the fastening portions, and
wherein the back cover includes a reinforcement rib on the interior surface of the back cover around the opening.

8. The steering device according to claim 7, wherein the back cover includes a portion which the reinforcement rib is provided on and has a uniform plate thickness.

9. The steering device according to claim 8, wherein the reinforcement rib includes a distal end positioned at a same height as a part of the interior surface of the back cover around an attachment position of the switch unit.

10. The steering device according to claim 7, wherein the reinforcement rib includes a distal end positioned at a same height as a part of the interior surface of the back cover around an attachment position of the switch unit.

11. The steering device according to claim 7, wherein the fastening portions are capable of fastening the switch unit to the back cover with screws.

* * * * *